United States Patent
Parris et al.

(10) Patent No.: US 11,504,833 B2
(45) Date of Patent: Nov. 22, 2022

(54) METHOD OF MANUFACTURING BALL JOINT WITH A THREADED DOMED COVER PLATE

(71) Applicant: Federal-Mogul Motorparts LLC, Southfield, MI (US)

(72) Inventors: Johnny Parris, Southfield, MI (US); Dustin Schrieber, Southfield, MI (US); Glen C. Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 17/203,183

(22) Filed: Mar. 16, 2021

(65) Prior Publication Data
US 2022/0297275 A1   Sep. 22, 2022

(51) Int. Cl.
| | | |
|---|---|---|
| *B25B 27/02* | (2006.01) | |
| *B23P 11/00* | (2006.01) | |
| *B23P 15/00* | (2006.01) | |
| *B25B 27/06* | (2006.01) | |

(52) U.S. Cl.
CPC .......... *B25B 27/062* (2013.01); *B23P 11/005* (2013.01); *B25B 27/023* (2013.01); *B23P 15/00* (2013.01); *B23P 2700/14* (2013.01)

(58) Field of Classification Search
CPC .... B25B 27/062; B25B 27/023; B23P 11/005; B23P 15/00; B23P 2700/14
See application file for complete search history.

(56) References Cited

U.S. PATENT DOCUMENTS

| | | | | |
|---|---|---|---|---|
| 3,389,928 A | * | 6/1968 | Wehner | B60G 7/005 403/126 |
| 6,125,541 A | * | 10/2000 | Parker | B23P 11/005 29/446 |
| 6,202,280 B1 | * | 3/2001 | Parker | F16C 11/0642 29/441.1 |
| 6,413,003 B1 | * | 7/2002 | Schmidt | F16C 11/086 403/135 |
| 6,454,484 B1 | * | 9/2002 | Parker | F16C 11/0628 403/132 |
| 6,532,665 B2 | * | 3/2003 | Parker | B23P 11/005 29/898.1 |
| 6,619,873 B2 | * | 9/2003 | Parker | F16C 11/0642 403/135 |

(Continued)

FOREIGN PATENT DOCUMENTS

| | | | | |
|---|---|---|---|---|
| DE | 102008031421 A1 | * | 1/2010 | B21D 22/14 |
| DE | 102018125459 | | 4/2020 | |

(Continued)

*Primary Examiner* — Lawrence Averick
(74) *Attorney, Agent, or Firm* — Burris Law, PLLC

(57) ABSTRACT

A method of manufacturing a vehicle suspension component includes inserting a cover body into an aperture of a housing, the cover body being disposed about a central axis concentric with the aperture of the housing, the cover body having a convex side and a concave side and an outer perimeter disposed about the central axis, the cover body defining a threaded bore concentric with the central axis, and deforming the cover body into retaining engagement with the housing by pressing against the convex side until the cover body is at least partial deformed and the outer perimeter is expanded compared to a pre-deformed state of the cover body.

19 Claims, 6 Drawing Sheets

(56) References Cited

U.S. PATENT DOCUMENTS

| | | | | |
|---|---|---|---|---|
| 7,421,785 | B2* | 9/2008 | Spence | F16C 11/0642 |
| | | | | 403/135 |
| 8,931,768 | B2 | 1/2015 | Geisler et al. | |
| 2002/0031396 | A1* | 3/2002 | Parker | F16C 11/0652 |
| | | | | 403/137 |
| 2002/0129482 | A1* | 9/2002 | Parker | F16C 11/0685 |
| | | | | 29/441.1 |
| 2003/0044227 | A1* | 3/2003 | Parker | F16C 11/086 |
| | | | | 403/135 |
| 2005/0235476 | A1* | 10/2005 | Spence | F16C 11/0609 |
| | | | | 29/451 |
| 2006/0029461 | A1* | 2/2006 | Benick | F16C 11/0647 |
| | | | | 403/122 |
| 2008/0292391 | A1* | 11/2008 | Spence | B21K 25/00 |
| | | | | 403/135 |
| 2020/0018347 | A1* | 1/2020 | Parker | B23P 11/005 |

FOREIGN PATENT DOCUMENTS

| | | |
|---|---|---|
| EP | 1375317 | 1/2004 |
| JP | 2008128413 | 6/2008 |
| KR | 101560686 | 10/2015 |
| KR | 101891587 | 8/2018 |

* cited by examiner

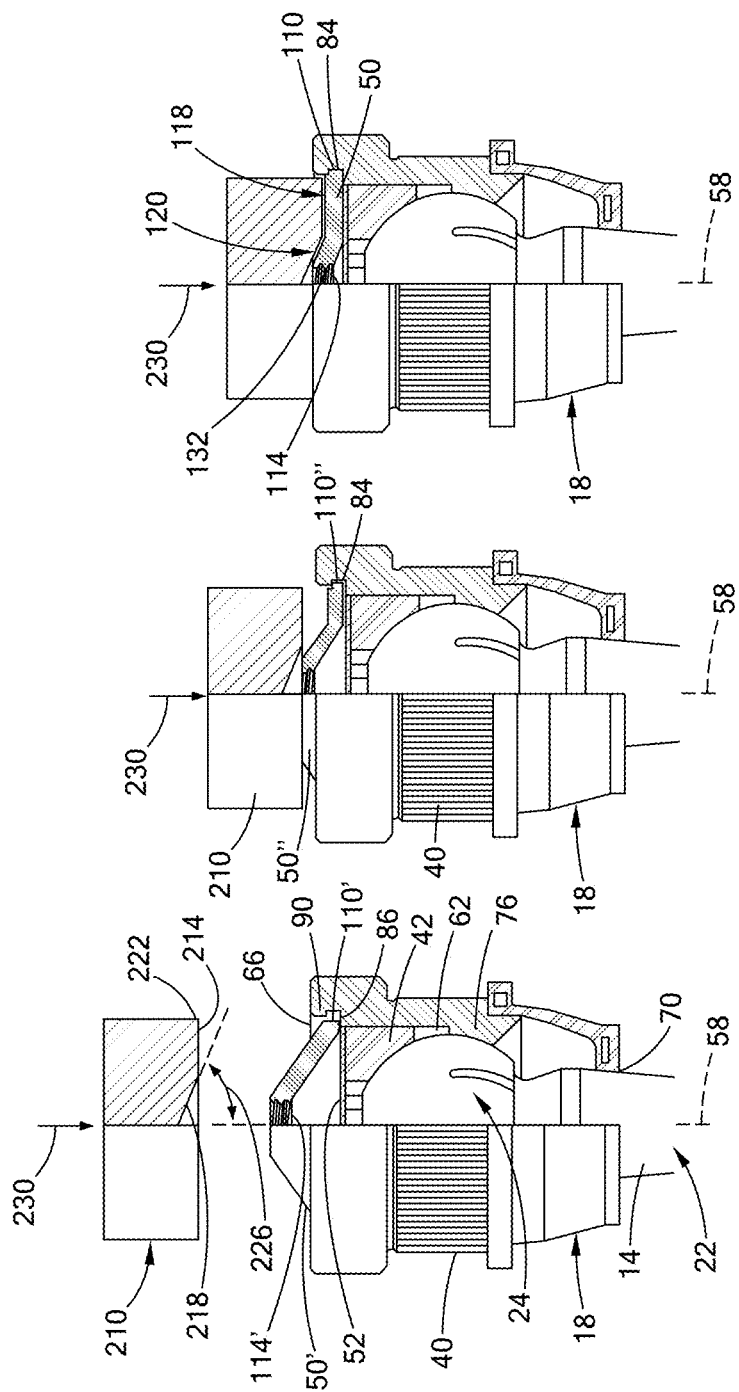

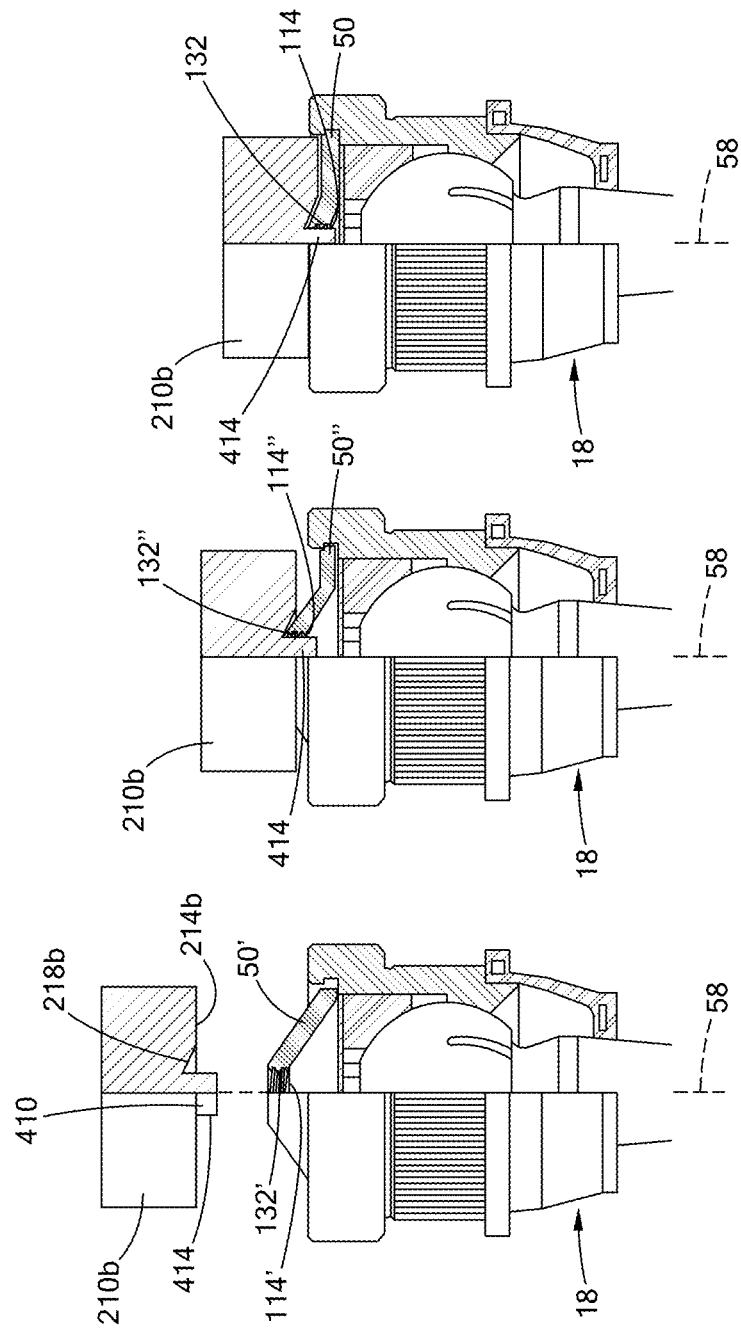

METHOD OF MANUFACTURING BALL JOINT WITH A THREADED DOMED COVER PLATE

FIELD

The present disclosure relates to a method of manufacturing ball joints and more particularly, a method of manufacturing ball joints having cover plates.

BACKGROUND

The statements in this section merely provide background information related to the present disclosure and may not constitute prior art.

Ball joints typically include a housing and a stud or rod. The rod includes a ball at one end that is received in the housing and configured to pivot therein. Typically, the rod is inserted through a first aperture in one end of the housing until the ball seats on mating surfaces within the housing. The other end of the rod extends from the housing through a second aperture in the opposite, end of the housing. A cover plate typically covers the first aperture of the housing to retain the ball within the housing. In traditional ball joints, the housing is deformed (e.g., rolled) over the cover plate to secure the cover plate to the housing.

In some applications, it can be desirable to be able to apply lubricant such as grease to the interior of the ball joint after installation of the cover plate. In traditional ball joints in which the housing is deformed over the cover plate, the cover plate can be pre-drilled and tapped with a desired thread that matches the thread of a desired lubricant fitting (e.g., a grease zerk). The lubricant fitting can then be threaded onto the cover plate after the cover plate is secured to the housing.

However, in some ball joints, the cover plate starts in a domed shape and is deformed into a generally flatter shape until the perimeter is secured to the housing, Such cover plates are not pre-tapped for lubricant fittings.

The method of the present disclosure addresses these issues, among others, of manufacturing ball joints with domed cover plates.

SUMMARY

This section provides a general summary of the disclosure and is not a comprehensive disclosure of its full scope or all of its features.

In one form of the present disclosure, a method of manufacturing a vehicle suspension component includes inserting a cover body into an aperture of a housing, the cover body being disposed about a central axis concentric with the aperture of the housing, the cover body having a convex side and a concave side and an outer perimeter disposed about the central axis, the cover body defining a threaded bore concentric with the central axis, and deforming the cover body into retaining engagement with the housing by pressing against the convex side until the cover body is at least partial deformed and the outer perimeter is expanded compared to a pre-deformed state of the cover body. According to a variety of alternative configurations: the method further includes threading a fitting into the threaded bore; the fitting is a grease zerk; deforming the cover body into retaining engagement with the housing includes deforming the outer perimeter of the cover body radially outward into a groove defined by the housing; the method further includes inserting a pin into the threaded bore and wherein the cover body is deformed into retaining engagement with the housing while the pin is disposed within the threaded bore; the pin is a diameter equal to a desired minimum thread diameter that is less than a minimum thread diameter of the threaded bore in the pre-deformed state; the method further includes deforming the threaded bore so that a diameter of the threaded bore is reduced from the pre-deformed state of the cover body; the method further includes producing the cover body including tapping the threaded bore using a tap of a first thread size and an initial class of fit, and the method further includes threading a fitting into the threaded bore after deforming the cover body into retaining engagement with the housing, the fitting having a thread of the first thread size and a class of fit that is different than the initial class of fit; the method further includes producing the cover body including tapping the threaded bore using a tap of an initial thread size, and the method further includes threading a fitting into the threaded bore after deforming the cover body into retaining engagement with the housing, the fitting having a thread of a smaller thread size than the initial thread size; the method further includes producing the cover body including tapping the threaded bore with a tapered thread and wherein deforming the cover body includes deforming the threaded bore to reduce a taper of the tapered thread; the cover body is deformed into retaining engagement with the housing by pressing a die against the convex side of the cover body, the die having an outer die portion and an inner die portion, the outer die portion engaging an outer portion of the cover plate, the inner die portion engaging an inner portion of the cover plate; the threaded bore is disposed in a boss defined by the cover body after deforming the cover body; the method further comprising inserting a rod into the housing and seating a ball disposed at a first end of the rod within the housing for pivoting movement relative to the housing, wherein a second end of the rod extends through an end of the housing, wherein deforming the cover body into retaining engagement with the housing secures the ball within the housing.

In another form of the present disclosure, a method of manufacturing a vehicle suspension component includes inserting a rod into a housing so that a ball portion disposed at a first end of the rod is seated within the housing and pivotable relative to the housing and a second end of the rod extends from the housing, inserting a cover body into an aperture of the housing, the cover body defining a threaded bore of a first diameter, and deforming the cover body such that a perimeter of the cover body is deformed into retaining engagement with the housing and a thread of the threaded bore is deformed. According to an alternative configuration: the method further includes inserting a pin into the threaded bore and the thread is deformed against the pin; the method further includes producing the cover body including tapping the threaded bore using a tap of a first thread size and an initial class of fit, and threading a fitting into the threaded bore after deforming the cover body, the fitting having a thread of the first thread size and a class of fit that is different than the initial class of fit; the method further includes producing the cover body including tapping the threaded bore using a tap of an initial thread size, and threading a fitting into the threaded bore after deforming the cover body, the fitting having a thread of a smaller thread size than the initial thread size; the method further includes producing the cover body including tapping the threaded bore such that the thread of the threaded bore is tapered and wherein deforming the thread of the threaded bore reduces a taper of the thread.

In still another form of the present disclosure, a method of manufacturing a vehicle suspension component includes inserting a rod into an aperture defined in a first end of a housing so that a ball portion disposed at a first end of the rod is seated within the housing and pivotable relative to the housing and a second end of the rod extends through an aperture defined in a second end of the housing, inserting a bearing into the aperture defined in the first end of the housing so that the bearing seats on the ball portion, inserting a cover body into the aperture defined in the first end of the housing, the cover body defining a threaded bore of a first diameter, and deforming the cover body such that a perimeter of the cover body is deformed into a circumferential groove defined by the housing and a thread of the threaded bore is deformed. According to an alternative configuration, the method further includes inserting a pin into the threaded bore to limit deformation of the thread while deforming the cover body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
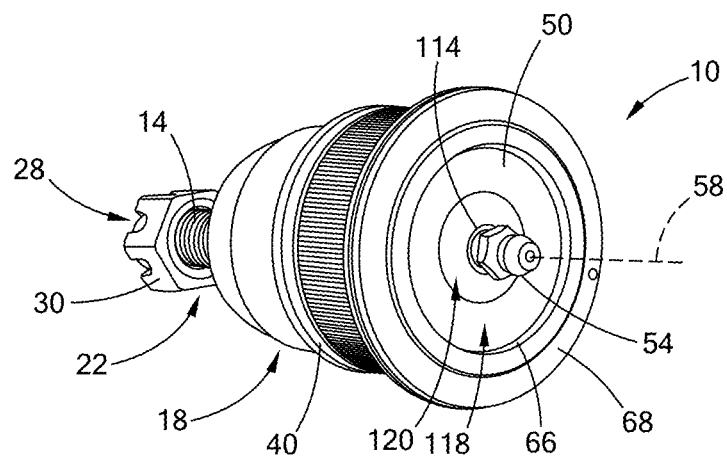
FIG. 1 is a perspective view of a ball joint according to the teachings of the present disclosure.
Figure 3:
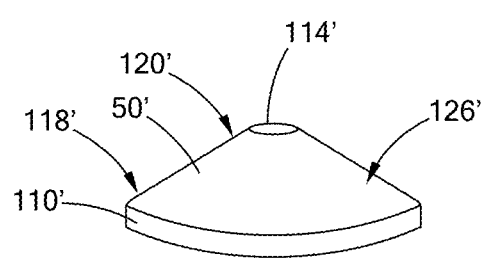
FIG. 3 is a schematic perspective view of the domed cover plate of FIG. 2 in a pre-installed condition in accordance with the teachings of the present disclosure.
Figure 9:
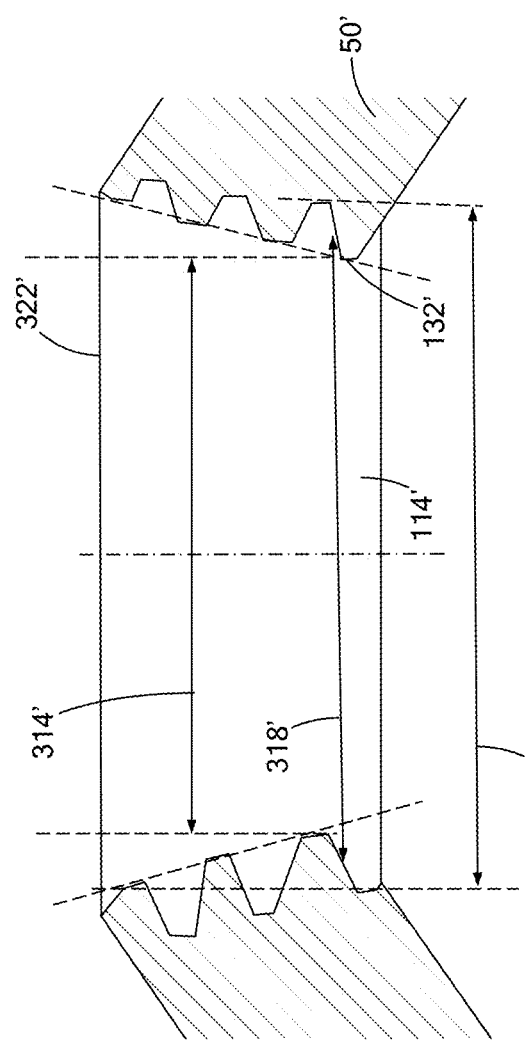
Figure 10:
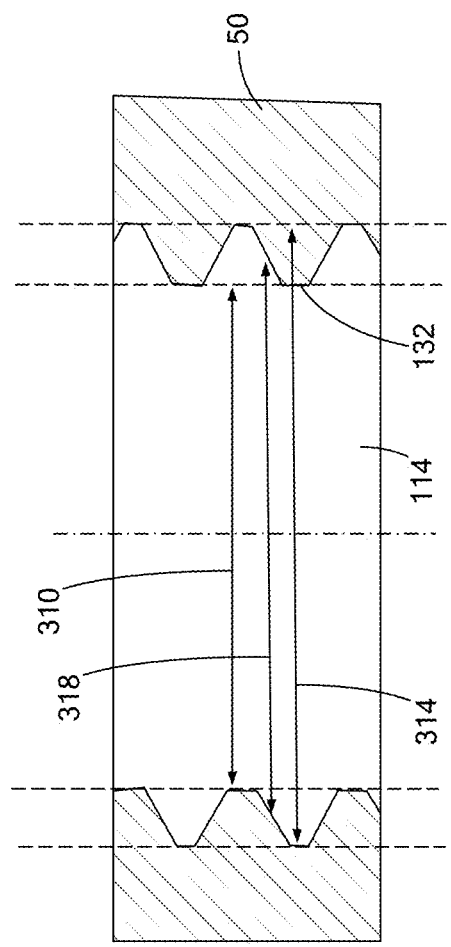
Figure 14:
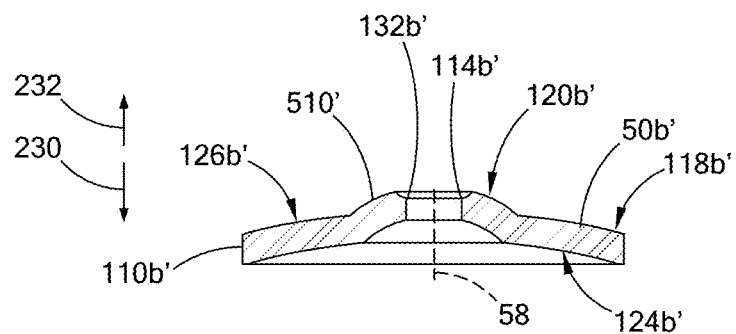
Figure 15:
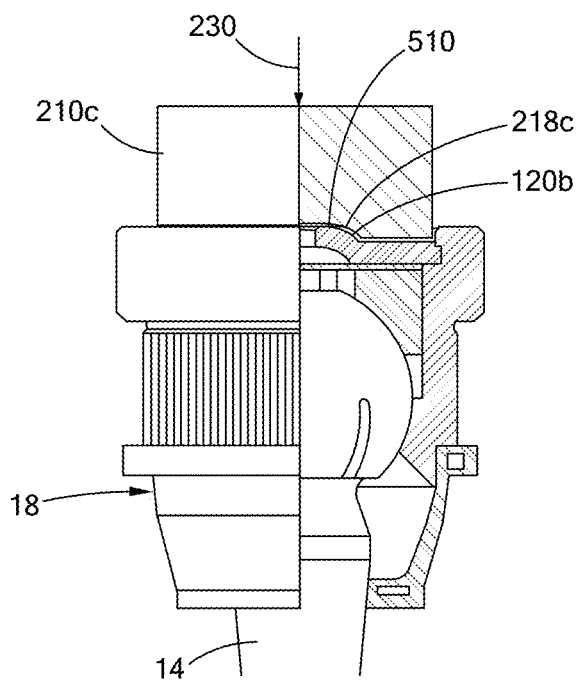

FIG. 6 a schematic partial cross-sectional view of the ball joint of FIG. 1, illustrating the cover plate in the pre-installed condition and a die of a first configuration in accordance with the teachings of the present disclosure;

FIG. 7 is a schematic partial cross-sectional view of the ball joint and die of FIG. 6 illustrated in a partially installed condition;

FIG. 8 is a schematic partial cross-sectional view of the ball joint and die of FIG. 6 illustrated with the cover plate in the installed condition;

FIG. 9 is a schematic cross-sectional view of a portion of the cover plate of FIG. 3, illustrating a threaded bore of the cover plate in the pre-installed condition in accordance with the teachings of the present disclosure;

FIG. 10 is a schematic cross-sectional view of the portion of the cover plate of FIG. 9, illustrating the threaded bore in the installed condition in accordance with the teachings of the present disclosure;

FIG. 11 a schematic partial cross-sectional view of the ball joint of FIG. 1, illustrating the cover plate in the pre-installed condition and a die of a second configuration in accordance with the teachings of the present disclosure;

FIG. 12 is a schematic partial cross-sectional view of the ball joint and die of FIG. 11 illustrated in a partially installed condition;

FIG. 13 is a schematic partial cross-sectional view of the ball joint and die of FIG. 11 illustrated with the cover plate in the installed condition;

FIG. 14 is a cross-sectional view of a cover plate of a second configuration illustrated in a pre-installed condition in accordance with the teachings of the present disclosure; and FIG. 15 is a cross-sectional view of the cover plate of FIG. 14 in an installed condition in a ball joint of a second configuration in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 2:
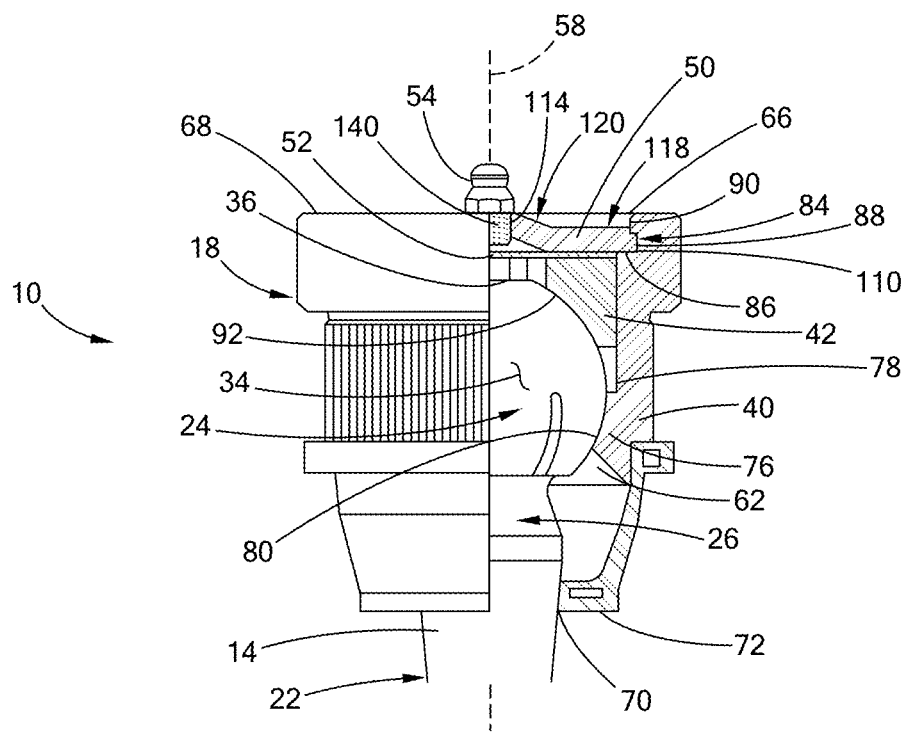
FIG. 2 is a partial cross-sectional view of the ball joint of FIG. 1, illustrating a domed cover plate in an installed condition and a lubricant fitting installed in the domed cover plate according to the teachings of the present disclosure.

Referring to FIGS. 1 and 2, a vehicle suspension can include a component or ball joint 10. The ball joint 10 includes a stud or rod member 14 and a housing assembly 18. The rod member 14 includes a shaft portion 22 and a ball portion 24 disposed at one end 26 of the shaft portion 22. In the particular example provided, the opposite end 28 of the shaft portion 22 is threaded such that a nut 30 can be matingly threaded thereto, though other configurations can be used. The ball portion 24 has a generally spherical surface 34. In the example provided, the ball portion 24 can have a flat face 36 distal from the shaft portion 22, though other configurations can be used.

The housing assembly 18 includes a housing body 40, a bearing 42, and a cover plate 50. In the example provided, the housing assembly 18 also includes a biasing member 52 and a lubricant fitting 54. The housing body 40 disposed about a central axis 58 and defines an interior cavity 62. The housing body 40 defines a first aperture 66 at one axial end 68 of the housing body 40 and a second aperture 70 at an opposite axial end 72 of the housing body 40. The first aperture 66 and the second aperture 70 are open to the exterior of the housing body 40 and open to the interior cavity 62. The housing body 40 also defines a ball seat 76 that protrudes radially inward into the interior cavity 62 from a wall 78 of the housing body 40. The ball seat 76 includes a concave spherically shaped surface 80 that mates with the spherical surface 34 of the ball portion 24 to seat the ball portion 24 within the interior cavity 62 and permit pivoting of the ball portion 24 relative to the housing body 40. The ball seat 76 also inhibits the ball portion 24 from being removed through the second aperture 70. The concave spherically shaped surface 80 may extend circumferentially about the axis 58. In an alternative configuration, discrete spherically shaped surfaces can be spaced in the circumferential direction about the axis 58 to seat the ball portion 24. With the ball portion 24 seated on the ball seat 76, the shaft portion 22 extends through the second aperture 70.

The wall 78 of the housing body 40 proximate the first aperture 66 includes a circumferential groove 84 that is disposed about the axis 58 and defined by a shoulder 86, a radially outward recessed surface 88, and a lip 90. The shoulder 86 has an inner diameter that is less than an inner diameter of the lip 90 and the recessed surface 88 is extends axially between the shoulder 86 and the lip 90 and is disposed at a diameter that is greater than that of the lip 90. In the example provided, the lip 90 defines the first aperture 66 and extends axially to the axial end 68 of the housing body 40.

The bearing 42 is disposed about the axis 58 within the interior cavity 62 and defines a generally concave spherical surface 92 that mates with the spherical surface 34 of the ball portion 24 to seat the ball portion 24 within the interior cavity 62 and permit pivoting therein.

The cover plate 50 is a generally annular shape having an outer perimeter 110 and a central bore 114. The cover plate 50 has an outer portion 118 and an inner portion 120. The outer portion 118 extends radially outward from the inner portion 120 to the perimeter 110 and may be approximately flat or perpendicular to the axis 58, though other configurations can be used such as being slightly domed (e.g., conical or curved) for example. The inner portion 120 defines the central bore 114. In the example provided, the inner portion 120 may form an angle with the outer portion 118 such that the inner portion 120 may be slightly domed (e.g., conical or curved) in shape protruding axially from the outer portion 118 to the central bore 114. The central bore 114 is threaded.

In the example provided, the lubricant fitting 54 is matingly threaded into the central bore 114. The lubricant fitting 54 is configured to permit lubricant (e.g., grease) to be selectively injected into the interior cavity 62. In the example provided, the lubricant fitting 54 is a grease zerk, though other configurations may be used. The biasing member 52 is disposed about the axis 58 and axially between the bearing 42 and the cover plate 50. In the example provided, the biasing member 52 is a Belleville washer that contacts the outer portion 118 of the cover plate 50 and the bearing 42, though other configurations can be used. The biasing member 52 biases the bearing 42 axially into contact with the ball portion 24.

Figure 4:
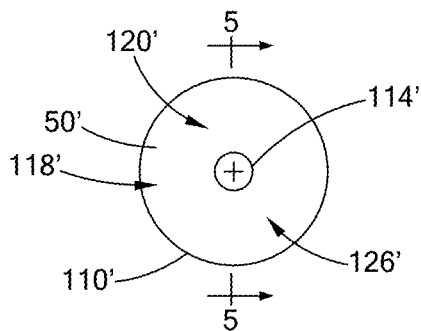
FIG. 4 is a top view of the cover plate of FIG. 3.
Figure 5:
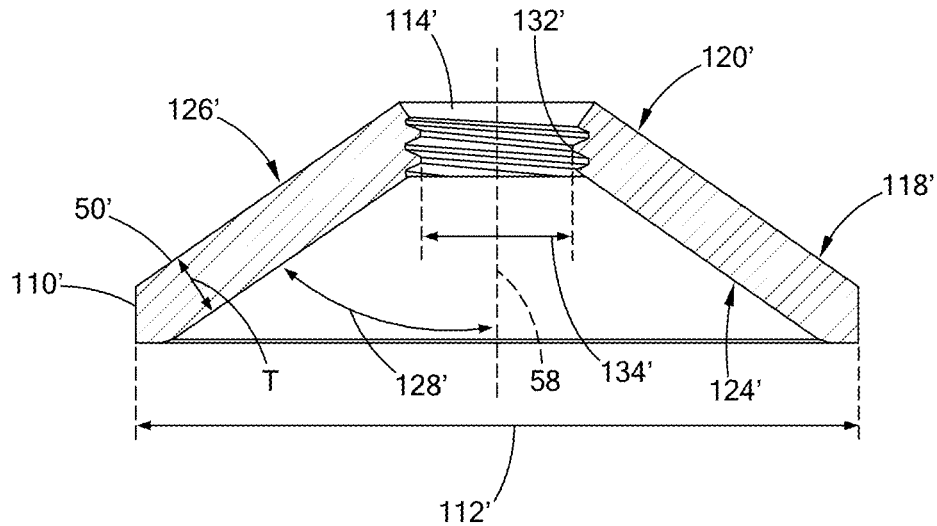
FIG. 5 is a schematic cross-sectional view of the cover plate of FIG. 3 taken along line 5-5 shown in FIG. 4.

Referring to FIGS. 3-5, the cover plate 50' is illustrated in a pre-installed condition. The cover plate 50' is the cover plate 50 of FIGS. 1 and 2 except that the cover plate 50 illustrated in FIGS. 1 and 2 is in the installed condition. Accordingly, similar features are identified with similar but primed reference numerals and only differences are described in detail herein. Before being installed, the cover plate 50' is generally domed (e.g., conical or curved) such that the cover plate 50' has a concave side 124' and a convex side 126'. In the example provided, the cover plate 50' has a frustoconical shape such that the inner portion 120' and the outer portion 118' form the same angle 128' relative to the central axis 58'. In one form, the angle 128' can be in the range of 30°-40°, such as 35°, though other angles or ranges of angles can be used. In an alternative configuration, not specifically shown, the cover plate 50' may have a curved or arched dome shape.

Referring to FIGS. 3-10, a method of manufacturing the ball joint 10 of FIGS. 1 and 2 is illustrated and described. Referring to specifically to FIGS. 3-5, the cover plate 50' is formed into its domed (e.g., frustoconical) shape. In the example provided, the cover plate 50' can be a metal material and may be stamped into the domed shape, though other methods of shaping the cover plate 50' can be used. The central bore 114' is then formed (e.g., drilled, punched, or cut) into the domed cover plate 50'. In an alternative configuration, the central bore 114 can be formed into the cover plate 50' before being stamped into the domed shape. With the cover plate 50' in the domed shape, the central bore 114' is then tapped to form a thread 132' therein.

Referring specifically to FIG. 6, the rod member 14 is inserted into the first aperture 66 of the housing body 40 until the shaft portion 22 extends through the second aperture 70 and the ball portion 24 is seated on the ball seat 76. The bearing 42 is then positioned concentric with the interior cavity 62 and inserted thereinto via the first aperture 66 until the bearing 42 is seated on the ball portion 24. The biasing member 52 is then positioned concentric with the interior cavity 62 and inserted via the first aperture 66 until in contact with the bearing 42.

While in the pre-installed condition (i.e., the domed shape with the threaded central bore 114'), the cover plate 50' is positioned concentric with the interior cavity 62 and inserted into the first aperture 66 such that the perimeter 110' is seated on the shoulder 86 and the central bore 114' is axially exterior of the housing body 40. In this position, the perimeter 110' has a diameter that is less than that of the lip 90. A die 210 is aligned coaxially with the cover plate 50' and begins to move toward the cover plate 50'.

In the example provided, the die 210 includes an outer die face 214 and an inner die face 218, though other configurations can be used. The outer die face 214 coincides with the outer portion 118 (FIGS. 2 and 8) of the installed cover plate 50 (FIGS. 2 and 8). In the example provided, the outer die face 214 is generally perpendicular to the axis 58 and disposed annularly about the axis 58, though the outer die face 214 need not be exactly perpendicular. An outer perimeter 222 of the outer die face 214 has a diameter that is less than the diameter of the lip 90 such that the die 210 can be received in the first aperture 66. The inner die face 218 coincides with the inner portion 120 (FIGS. 2 and 8) of the installed cover plate 50 (FIGS. 2 and 8) and extends radially inward from the outer die face 214. In the example provided, the inner die face 218 extends radially inward at an angle 226 relative to the axis 58 such that the inner die face 218 is concave and generally conically or frustoconically shaped. In an alternative configuration, not specifically shown, the inner die face 218 may have a curved concave shape.

The die 210 moves axially in the direction 230 (i.e., toward the cover plate 50') until it contacts the cover plate 50' and then begins to press the cover plate 50' axially. Referring to FIG. 7, the cover plate 50'' is illustrated in a partially installed condition and features thereof are referred to herein with the similar but double primed reference numerals. As the die 210 continues to move axially in the direction 230, the cover plate 50'' begins to deform (e.g., flatten) proximate the perimeter 110''. The deforming (e.g., flattening) causes the perimeter 110'' to expand radially outward into the circumferential groove 84 to secure the cover plate 50'' to the housing body 40.

Referring to FIG. 8, the die 210 continues to move axially in the direction 230 and continues to deform (e.g., flatten) at least the outer portion 118 of the cover plate 50 until the cover plate 50 is in the installed condition as shown.

Referring to FIGS. 9 and 10, the thread 132' of the central bore 114' of the cover plate 50' in the preinstalled condition and the thread 132 of the central bore 114 of the cover plate 50 in the installed condition are illustrated. The thread 132' is tapped with a tap (not shown) that has a threadform that does not match and cannot be matingly threaded with the threadform of a thread 140 of the lubricant fitting 54 (FIGS. 1-2). The threadform of the thread 132 in the installed condition can be matingly threaded with the threadform of the thread 140 of the lubricant fitting 54 (FIGS. 1-2). In the example provided, the diameters (e.g., major diameter 310', minor diameter 314', and pitch diameter 318') of the thread 132' in the preinstalled condition are greater than the corresponding diameters (e.g., major diameter 310, minor diameter 314, and pitch diameter 318) of the thread 132 in the installed condition.

In the example provided, the thread 132' in the preinstalled condition is a tapered threadform such that it expands toward a top end 322' of the central bore 114'. The process of deforming (e.g., flattening) the cover plate 50, 50', 50" with the die 210 shown in FIGS. 6-8 causes the thread 132' to deform to become approximately a straight thread or at least a less tapered thread when in the installed condition. In an alternative configuration, the thread 132' in the preinstalled condition can be a straight threadform and the thread 132 in the installed condition can remain a straight threadform and reduce in diameter and/or otherwise be deformed.

In one configuration, the thread 132' in the preinstalled condition is tapped at a larger thread size than the thread size of the thread 140 of the lubricant fitting (FIGS. 1-2). In this regard, thread size refers to the nominal diameter of the threadform. For example, the thread 132' can be tapped with a 5/16 inch (7.94 mm) tap and the thread 140 of the lubricant fitting 54 (FIGS. 1-2) can be a 1/4 inch (6.35 mm) threadform, though other sizes may be used. The process of deforming (e.g., flattening) the cover plate 50, 50', 50" with the die 210 shown in FIGS. 6-8 causes the thread 132' to deform to be approximately the same thread size as the thread 140 of the lubricant fitting 54 (FIGS. 1-2) when in the installed condition.

In another configuration, the thread 132' in the preinstalled condition is tapped at the same thread size as the thread 140 of the lubricant fitting 54 (FIGS. 1-2) but with a different class of fit. In this regard, class of fit, also known as tolerance class or thread class, refers to the acceptable range of pitch diameter. For example, the thread 132' can be tapped with a 1/4 inch (6.35 mm) Class 1 fit and the thread 140 of the lubricant fitting 54 (FIGS. 1-2) can be a 1/4 inch (6.35 mm) Class 2 or higher fit. The process of deforming (e.g., flattening) the cover plate 50, 50', 50" with the die 210 shown in FIGS. 6-8 causes the thread 132' to deform to be approximately the same class of fit as the thread 140 of the lubricant fitting 54 (FIGS. 1-2) when in the installed condition.

In yet another configuration, the size of the thread 132' (e.g., the minor diameter thereof), and thus the bore 114', are determined according to a predetermined equation that accounts for the material and geometry of the cover plate 50', the geometry of the circumferential groove 84, and the desired minor diameter of the thread 132. In one example, the equation can be represented as:

$$\phi_{Minor\ required\ at\ start} = \frac{X_A * (C_2 * \phi_{minor\ desired} + C_1 * \phi_{OD} - C_1 * C_2)}{C_2 * C_3 * T * (\phi_{Groove\ OD} - \phi_{minor\ desired})}$$

In the above example equation, $\phi_{Minor\ required\ at\ start}$ is the minor diameter (indicated by reference numeral 134' in FIG. 5) of the threads 132' before deformation; $\phi_{minor\ desired}$ is the minor diameter desired for the threads 132 after deformation; $\phi_{OD}$ is the outer diameter (indicated by reference numeral 112' in FIG. 5) of the cover plate before deformation; T is the thickness (indicated by reference numeral T in FIG. 5) of the cover plate 50' before deformation; $\phi_{Groove\ OD}$ is the diameter of the circumferential groove 84 of the housing body 40 into which the cover plate 50' is deformed and which constrains outward deformation thereof; $C_1$, $C_2$, and $C_3$ are constants that take into account characteristics of the material and/or geometry of the cover plate 50' such as accounting for flex or change in cross-sectional area of the cover plate 50' for example; and $X_A$ is half the cross-sectional area of the cover plate 50' before deformation.

The values for $C_1$, $C_2$, and $C_3$ can vary with the thickness and formed initial angle 128'. For cover plates 50' with thickness T in the range of 1.78-3.81 millimeters (0.07-0.15 inches), and an initial angle 128' in the range of 30°-40°, the constants can be in the ranges: $C_1$: 1.27-25.4 millimeters (0.05-1 inches); $C_2$: 25.4-76.2 millimeters (1-3 inches); $C_3$: 11.43-19.05 millimeters (0.45-0.75 inches). It is understood that other thicknesses T and other initial angles 128' can have different constant values for $C_1$, $C_2$, and $C_3$.

Since the cross-sectional area of the cover plate 50' before deformation depends on the minor diameter 134' of the threads 132' before deformation, the method of calculating the thread size with the above equation can include inputting a predicted value for the minor diameter 134', solving the equation, determining the error (e.g., % error) between the predicted value for the minor diameter 134' and the resulting value for the minor diameter 134' calculated based on that predicted value, and then iteratively adjusting the predicted value and recalculating the minor diameter 134' until the error is within a predetermined acceptable error. In one form, the iterative process can proceed until the input predicted value for the minor diameter 134' is within 10% error of the calculated value, though other error tolerances can be used. Once the calculated minor diameter 134' is within the acceptable tolerances, the threads 132' can be formed to have that calculated minor diameter 134'.

While the equation provided above is one example of an equation that relates the material and geometry of the cover plate 50', the geometry of the circumferential groove 84, and the desired minor diameter of the thread 132', other equations can be used determine the size of the threads 132' before deformation with a similar iterative process.

Referring to FIGS. 11-13, an alternative method of manufacturing the ball joint 10 of FIGS. 1 and 2 is illustrated and described. The method shown and described with reference to FIGS. 11-13 is similar to that of FIGS. 3-10 except that the die 210b includes a pin or mandrel 410. The die 210b is otherwise similar to the die 210 (FIGS. 6-8) and similar features are identified with similar numbers but with the suffix "b". The mandrel 410 is disposed concentrically with the central bore 114, 114', 114" and has an outer surface 414 that is a diameter equal to the desired minimum diameter of the thread 132 in the installed condition. The desired minimum diameter can be less than the minimum diameter of the thread 132' in the preinstalled condition. The mandrel 410 extends axially from the center of the die 210b and extends into the central bore 114, 114', 114". The mandrel 410 controls or limits radially inward deformation of the central bore 114', 114", 114 and the thread 132, 132', 132" during the pressing process.

Referring to FIG. 14, a cover plate 50b' of another configuration is illustrated in a preinstalled condition. The cover plate 50b' is similar to the cover plate 50' (FIGS. 3-5) except as otherwise shown or described herein. Accordingly, similar features are identified with similar numerals but with the suffix "b" and only differences are described in detail herein. For example, perimeter 110*b*' is similar to perimeter 110', thread 132*b*' is similar to thread 132', outer die face 214*b* is similar to outer die face 214, and inner die face 218*b* is similar to inner die face 218. In the example provided, the inner portion 120*b*' has a curved or arcuate shape or boss 510' that is concave in the axial direction 230 and convex in the opposite axial direction 232. The inner portion 120*b*' curves in a concave manner from the outer portion 118*b*' until the central bore 114*b*' on the concave side 124*b*' and curves in a convex manner from the outer portion 118*b*' until the central bore 114*b*' on the convex side 126*b*'.

Referring to FIG. 15, the method of installing the cover plate 50*b*', 50*b* is similar to the method shown and described with reference to FIGS. 3-10 except the die 210 or 210*b* is replaced with the die 210*c*. The die 210*c* is similar to the die 210 or 210*b* except as otherwise shown or described herein. Accordingly, similar features are identified with similar numerals but with the suffix "c" and only differences are described in detail herein. In the example provided, the inner die face 218*c* is curved or arcuate to match the inner portion 120*b* of the cover plate 50*b*. The curved or arcuate inner portion 120*b* and inner die face 218*c* can result in reduced the deformation of the central bore 114*b* and results in the cover plate 50*b* having a boss 510 in the installed condition. While not specifically shown, the die 210*c* may optionally include a mandrel similar to the mandrel 410 (FIGS. 11-13).

When an element or layer is referred to as being "on," "engaged to," "connected to" or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of manufacturing a vehicle suspension component, the method comprising:

inserting a cover body into an aperture of a housing, the cover body being disposed about a central axis concentric with the aperture of the housing, the cover body having a convex side and a concave side and an outer perimeter disposed about the central axis, the cover body defining a threaded bore concentric with the central axis;

inserting a pin into the threaded bore; and deforming the cover body into retaining engagement with the housing by pressing against the convex side until the cover body is at least partial deformed and the outer perimeter is expanded compared to a pre-deformed state of the cover body, wherein the cover body is deformed into retaining engagement with the housing while the pin is disposed within the threaded bore.

2. The method according to claim 1 further comprising threading a fitting into the threaded bore.

3. The method according to claim 2, wherein the fitting is a grease zerk.

4. The method according to claim 1, wherein deforming the cover body into retaining engagement with the housing includes deforming the outer perimeter of the cover body radially outward into a groove defined by the housing.

5. The method according to claim 1, wherein the pin is a diameter equal to a desired minimum thread diameter that is less than a minimum thread diameter of the threaded bore in the pre-deformed state.

6. The method according to claim 1 further comprising producing the cover body including tapping the threaded bore using a tap of a first thread size and an initial class of fit, and the method further includes threading a fitting into the threaded bore after deforming the cover body into retaining engagement with the housing, the fitting having a thread of the first thread size and a class of fit that is different than the initial class of fit.

7. The method according to claim 1 further comprising producing the cover body including tapping the threaded bore with a tapered thread and wherein deforming the cover body includes deforming the threaded bore to reduce a taper of the tapered thread.

8. The method according to claim 1, wherein the cover body is deformed into retaining engagement with the housing by pressing a die against the convex side of the cover body, the die having an outer die portion and an inner die portion, the outer die portion engaging an outer portion of the cover body, the inner die portion engaging an inner portion of the cover body.

9. A method of manufacturing a vehicle suspension component, the method comprising:
   inserting a cover body into an aperture of a housing, the cover body being disposed about a central axis concentric with the aperture of the housing, the cover body having a convex side and a concave side and an outer perimeter disposed about the central axis, the cover body defining a threaded bore concentric with the central axis;
   deforming the cover body into retaining engagement with the housing by pressing against the convex side until the cover body is at least partial deformed and the outer perimeter is expanded compared to a pre-deformed state of the cover body; and
   deforming the threaded bore so that a diameter of the threaded bore is reduced from the pre-deformed state of the cover body.

10. The method according to claim 1 further comprising inserting a rod into the housing and seating a ball portion disposed at a first end of the rod within the housing for pivoting movement relative to the housing, wherein a second end of the rod extends through an end of the housing, wherein deforming the cover body into retaining engagement with the housing secures the ball portion within the housing.

11. The method according to claim 9, wherein the threaded bore is disposed in a boss defined by the cover body after deforming the cover body.

12. The method according to claim 11 further comprising threading a fitting into the threaded bore.

13. The method according to claim 12, wherein the fitting is a grease zerk.

14. The method according to claim 11, wherein deforming the cover body into retaining engagement with the housing includes deforming the outer perimeter of the cover body radially outward into a groove defined by the housing.

15. The method according to claim 11, further comprising producing the cover body including tapping the threaded bore using a tap of a first thread size and an initial class of fit, and the method further includes threading a fitting into the threaded bore after deforming the cover body into retaining engagement with the housing, the fitting having a thread of the first thread size and a class of fit that is different than the initial class of fit.

16. The method according to claim 11 further comprising producing the cover body including tapping the threaded bore with a tapered thread and wherein deforming the cover body includes deforming the threaded bore to reduce a taper of the tapered thread.

17. The method according to claim 11, wherein the cover body is deformed into retaining engagement with the housing by pressing a die against the convex side of the cover body, the die having an outer die portion and an inner die portion, the outer die portion engaging an outer portion of the cover body, the inner die portion engaging an inner portion of the cover body.

18. The method according to claim 11, further comprising inserting a rod into the housing and seating a ball portion disposed at a first end of the rod within the housing for pivoting movement relative to the housing, wherein a second end of the rod extends through an end of the housing, wherein deforming the cover body into retaining engagement with the housing secures the ball portion within the housing.

19. A method of manufacturing a vehicle suspension component, the method comprising:
   inserting a cover body into an aperture of a housing, the cover body being disposed about a central axis concentric with the aperture of the housing, the cover body having a convex side and a concave side and an outer perimeter disposed about the central axis, the cover body defining a threaded bore concentric with the central axis;
   deforming the cover body into retaining engagement with the housing by pressing against the convex side until the cover body is at least partial deformed and the outer perimeter is expanded compared to a pre-deformed state of the cover body,
   wherein the method further comprises producing the cover body including tapping the threaded bore using a tap of an initial thread size, and the method further includes threading a fitting into the threaded bore after deforming the cover body into retaining engagement with the housing, the fitting having a thread of a smaller thread size than the initial thread size.

* * * * *